United States Patent [19]
Frankenfeld et al.

[11] 3,791,241
[45] Feb. 12, 1974

[54] HIGH ENERGY FOOD SUPPLEMENTS COMPRISING LINEAR ALIPHATIC 1,3-DIOLS

[75] Inventors: John W. Frankenfeld, Atlantic Highlands, N.J.; Sanford A. Miller, Chestnut Hill, Mass.

[73] Assignee: Esso Research and Engineering Company, Linden, N.J.

[22] Filed: June 30, 1972

[21] Appl. No.: 268,089

Related U.S. Application Data

[63] Continuation-in-part of Ser. No. 809,645, March 24, 1969, which is a continuation-in-part of Ser. No. 725,782, Feb. 1, 1968.

[52] U.S. Cl............................ 99/2 R, 99/122, 99/90, 99/150 R
[51] Int. Cl............................................ A23k 1/00
[58] Field of Search 99/2 R, 2 M, 2 G, 3, 2 F, 2 NO, 99/2 N, 4, 122, 123, 90 P, 91, 92, 140 R, 141, 150 R; 424/38, 343; 260/398

[56] References Cited
UNITED STATES PATENTS

| | | |
|---|---|---|
| 3,667,965 | 6/1972 | Frankenfeld et al............. 99/150 R |
| 3,732,112 | 5/1973 | Frankenfeld et al............. 99/150 R |
| 2,901,311 | 8/1959 | Nusslein et al..................... 260/635 |
| 2,681,878 | 6/1954 | Kauppi................................ 424/343 |
| 2,904,436 | 9/1959 | Auerbach.................................. 99/3 |

*Primary Examiner*—Norman Yudkoff
*Assistant Examiner*—Curtis P. Ribando
*Attorney, Agent, or Firm*—Leon Chasan

[57] ABSTRACT

Metabolic energy sources in foods are increased by incorporating in the foods from 1 to 75 percent by wt. of a compound selected from linear aliphatic polyols an mixtures thereof. The polyols have from about five to 15 carbon atoms in the chain and hydroxy groups only on alternate carbon atoms and on at least the first and third carbon atom.

9 Claims, 1 Drawing Figure

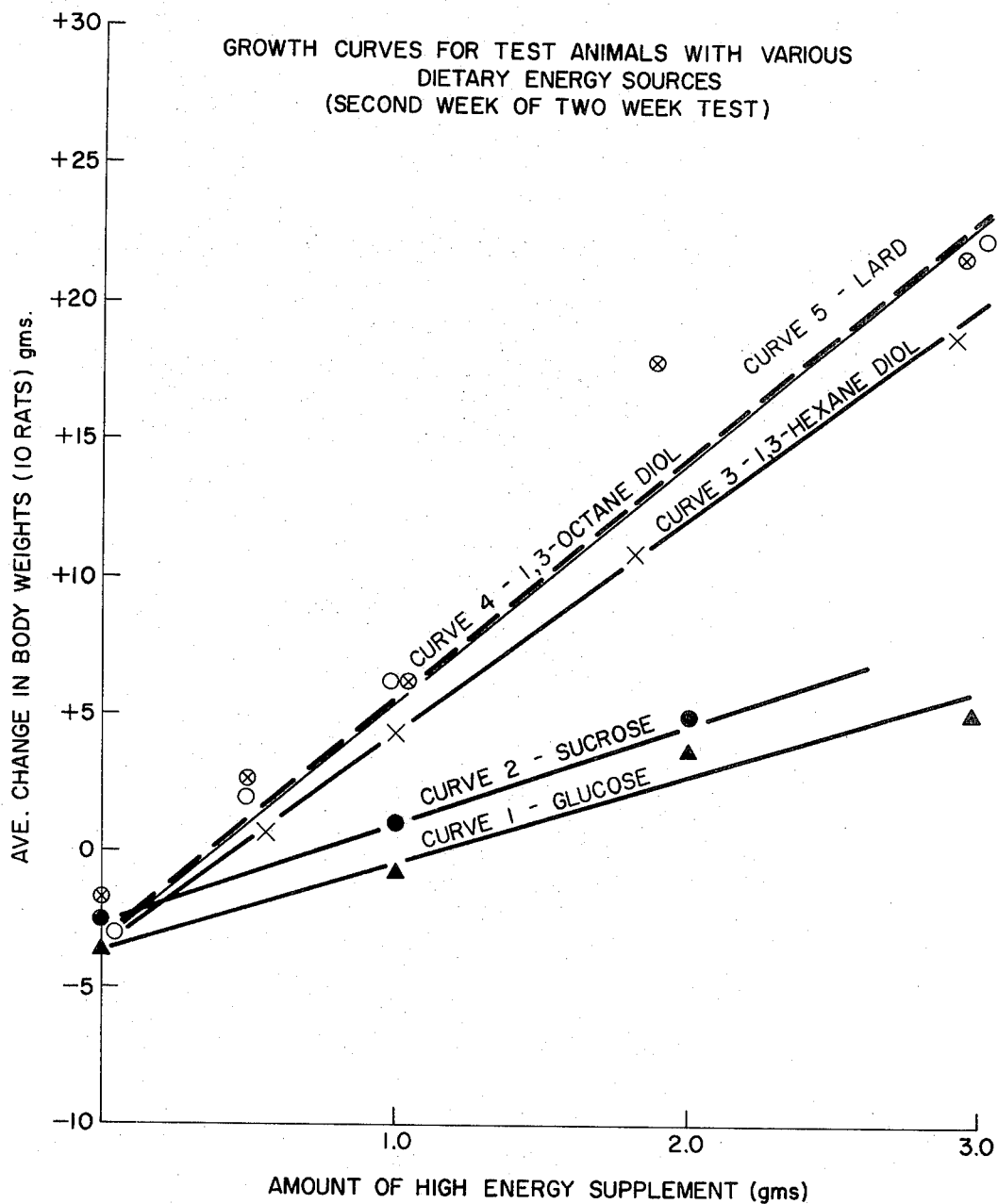

HIGH ENERGY FOOD SUPPLEMENTS COMPRISING LINEAR ALIPHATIC 1,3-DIOLS

CROSS REFERENCE TO RELATED APPLICATION

This application is a Continuation-in-Part of U.S. Ser No. 809,645, filed Mar. 24, 1969, which in turn is a Continuation-in-Part of U.S. Ser. No. 725,782, filed May 1, 1968.

BACKGROUND OF THE INVENTION

The present invention relates generally to high energy food compositions. More specifically, the present invention relates to a method of supplementing natural and/or compounded human and animal foods with materials that provide increased metabolic energy sources. The suitability of various classes of compounded foods for animals and humans depends upon the skill and integrity used in their processing. There is no best food that can be prepared to meet all existing conditions, and the ingredients in a mixed feed may be varied considerably. However, compounded foods must be sold on the basis of guaranteed minimum protein, fat, and nitrogen-free extract contents, and guaranteed maximum crude fiber and ash contents. The fat content of compounded foods is further limited in that the presence of natural fats and oils in these foods tends to promote their deterioration. Thus, in many instances, compounded foods are deficient in that they do not contain sufficient amounts of fats and natural oils or other energy producing elements.

Unfortunately, not only diets based on compounded foods tend to be unbalanced nutritionally but it is well known that in many countries of the world a sufficient variety of natural foods are not available to provide adequate diets for humans. Thus, there is a need for supplementing natural foods with additional energy sources where the total diet may well be deficient or where some other special reasons exist.

SUMMARY OF THE INVENTION

According to the present invention a method for increasing the metabolic energy sources of natural and compounded foods designed for human or animal consumption comprises incorporating in those foods from 1 to 75 wt. percent on a dry basis of a linear aliphatic polyol having from five to fifteen carbon atoms and hydroxy groups only on alternate carbon atoms and on at least the first and third carbon atom. Preferably, the metabolic energy sources of human or animal foods are increased according to this invention by incorporating in these foods from 10 to above 20 wt. percent of a linear aliphatic diol having from five to 10 carbon atoms in the molecule and having the hydroxy groups on the first and third carbon atom. Optionally mixtures of such polyols may be incorporated in the amounts specified.

In one embodiment of the present invention novel high energy food compositions are provided comprising food designed to be consumed by humans or animals and from 1 to 75 wt. % of a dihydroxy substituted linear aliphatic hydrocarbon or mixtures thereof, the said hydrocarbon having from five to 15 carbon atoms and having the hydroxy groups on the first and third carbon atom. Preferably, the high energy food compositions designed for animal consumption constitute a basal diet in an amount sufficient to support normal growth and the specific polyols further described herein.

BRIEF DESCRIPTION OF THE DRAWING

FIG. 1 is a graph illustrating the beneficial results provided in incorporating, in accordance with this invention, specific polyols in foods whereby the metabolic energy source of the foods are increased.

DETAILED DESCRIPTION OF THE INVENTION

The invention is based on the discovery that if particular polyols are used as additives in foods an excellent, high quality, high energy product results. These aliphatic polyols, such as aliphatic 1,3-diols and 1,3,5, x-polyols of five carbon atoms or more are nontoxic, energy-dense compounds which are very excellent when utilized for the production of energy. These compounds also have additional advantages over traditional caloric sources, such as fats and carbohydrates, and may be used to replace fats and carbohydrates in human and animal diets.

These aliphatic 1,3-diols and 1,3,5, x-polyols provide excellent sources of metabolic energy for humans and animals. These materials are synthesized easily, they have desirable properties, and are readily metabolized. These materials have several advantages over usual energy sources in that they are higher in caloric density than carbohydrates and proteins and are more stable than fats and thus may be used as replacements for natural foods. These materials are colorless, virtually odorless and tasteless and are easily formulated into human or animal foods or feeds. Since they are produced by chemical means from readily obtainable starting materials, the 1,3-diols and 1,3,5, x-polyols have marketing advantages in that they are available at stable prices and and in consistent quantities. They also may be produced readily in localities where arable land for grazing or cultivation is scarce.

The particular polyols of the present invention are linear aliphatic polyols, i.e., they are hydroxy substituted normal paraffins which contain from about five to 15 carbon atoms in the molecule, preferably about five to 10 carbon atoms in the molecule. Polyols containing less than five carbons are too low in calories to have any advantage over natural foods. The polyols contain hydroxy groups only on alternate carbon atoms and at least on the first and third carbon atom. It is this 1,3-dihydroxy or 1,3,5 x-poly-hydroxy configuration which renders these compounds useful as foods and food additives. Polyalcohols with hydroxyl groups in other positions on the carbon chain are not useful as foods as is shown in the specifications below. In addition to being non-toxic and readily metabolized the 1,3-diols and 1,3,5 x-polyols claimed herein have certain other advantages making them highly desirable as foods and food additives: (1) they are stable, non-volatile oils and have a long storage and shelf life; (2) they have an appreciable water solubility and are readily emulsified making them easy to formulate in food preparations; (3) they are readily adsorbed in the intestinal tract; and (4) they have a high caloric density, i.e., they afford a large number of calories on being metabolized for a given weight or volume of the compound. A summary of the compounds specifically claimed in this invention along with their caloric densities and some of their physical properties, is presented in Table I.

TABLE I

SOME POLYOLS AND THEIR PHYSICAL PROPERTIES

| Diol | BP/mm(°C) | Taste, Odor, etc. | Caloric Density K cal./gm[1] |
|---|---|---|---|
| 1,3-pentanediol | 78–81/0.5 | Colorless, sweet odor, bitter taste | 7.4 |
| 1,3-hexanediol | 81–82/0.2 | Colorless, slight musty odor, bitter taste | 7.8 |
| 1,3-heptanediol | 90/0.5 | Colorless, slight musty odor, slight bitter taste | 8.2 |
| 1,3-octanediol | 87–89/0.3 | Colorless, slight musty odor, slight bitter taste | 8.5 |
| 1,3-nonanediol | 126/1.1 | Colorless, slight musty odor, slight bitter taste | 8.7 |
| 1,3-decanediol | mp[2]=30–31 | Colorless, slight musty odor, slight bitter taste | 8.9 |
| 1,3-undecanediol | mp[2]=41–42 | Colorless, slight musty odor, slight bitter taste | 9.1 |
| 1,3,5-hexanetriol | 130–132/0.2 | 6.6 | |

[1] Caloric density is the theoretically available energy in Kilocalories per gram of the compound
[2] mp=melting point It is apparent from the above data that the 1,3-diols and 1,3,5 x-polyols are energy dense compounds with desirable physical properties. Of the common foods (protein: 4.1 Kcal/gm; carbohydrate: 4.1 Kcal/gm; and fat: 9.3 Kcal/gm.) only fats have caloric densities comparable to these polyalcohols. Fats, however, have severe limitations as energy sources because they tend to produce undesirable "ketone bodies" in the blood when present at high levels in the diet. A practical upper limit of about 50 percent of total calories can be tolerated in the form of fats.

All compounds listed in Table I are viscous, nonvolatile oils. These properties render them stable and easy to incorporate into human or animal diets. For these reasons as well as those enumerated in the foregoing, 1,3-diols and 1,3,5,x-polyols are superior energy sources which can serve as replacements for carbohydrates or fats in human and animal diets.

While these materials may be prepared by any satisfactory method the following methods are very satisfactory for their preparation.

The Reformatsky reaction followed by reduction:

$$RCHO + BrCH_2CO_2C_2H_5 \xrightarrow{Zn} \underset{OH}{RCHCH_2CO_2C_2H_5} \xrightarrow[\text{Hydride}]{H_2 \text{ or}} \underset{OH}{R}\underset{OH}{CHCH_2CH_2}$$

or by means of the Prins reaction of formaldehyde and the appropriate olefin or mixtures of olefins:

$$RCH=CH_2 + HCHO \xrightarrow{H_3^+O} \underset{OH}{R}\underset{OH}{CHCH_2CH_2}$$

The 1,3,5-hexanetriol has been synthesized by the following sequence of reactions:

$$CH_2=CHCH_2CH_2OH + CH_3CHO \xrightarrow{H_3^{\oplus}O}$$

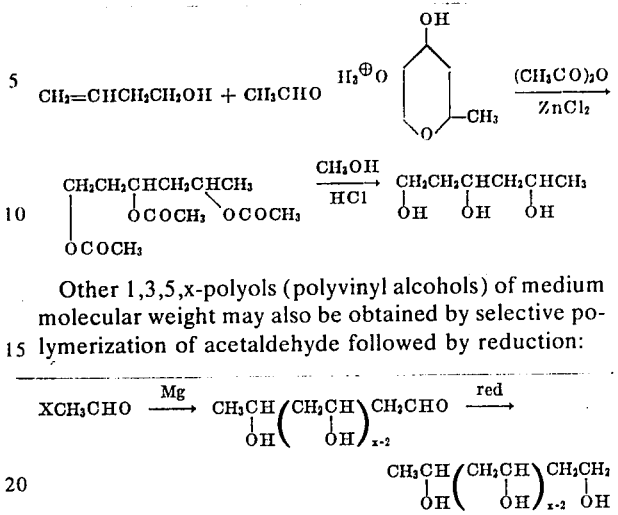

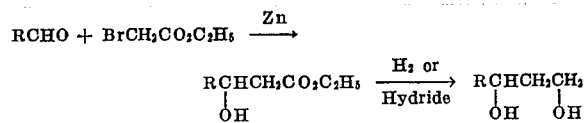

Other 1,3,5,x-polyols (polyvinyl alcohols) of medium molecular weight may also be obtained by selective polymerization of acetaldehyde followed by reduction:

$$XCH_3CHO \xrightarrow{Mg} \underset{OH}{CH_3CH}\left(\underset{OH}{CH_2CH}\right)_{x-2} CH_2CHO \xrightarrow{red}$$

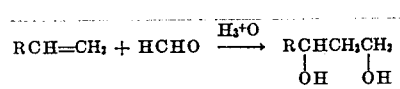

As pointed out heretofore, the compounds of the present invention are food supplements and may be incorporated in animal and human foods such as in cereals, meal, and any food compound designed for human or animal consumption. They may be used in any application in which fats and carbohydrates are currently used. The amount of these polyols used may vary from 1–75 percent of the dry weight of the diet. Preferably, to get optimum utilization, they should be used in amounts ranging between 10–20 percent of the dry weight of the diet.

Compounded foods include formulations of natural foods such as combinations of grains, soybeans and the like as well as prepared foods such as bread, the so-called breakfast cereals, formula diets, and synthetic milks.

Two illustrations of feed formulations that may be supplemented with the 1,3 diols and 1,3,5-x-polyols of this invention are given in Tables II and III below.

TABLE II

ALL MASH STARTING FEED FOR CHICKENS

| Ingredient | Pounds per 100 pounds | Pounds per ton |
|---|---|---|
| Ground yellow corn | 25.00 | 500 |
| Pulverized oats | 15.00 | 300 |
| Wheat middlings, standard | 15.00 | 300 |
| Soybean meal | 12.50 | 250 |
| Corn gluten meal | 9.75 | 195 |
| Fish meal | 8.50 | 170 |
| Dried skim milk | 2.50 | 50 |
| Dehydrated alfalfa meal | 7.50 | 150 |
| Dried distillers' solubles | 2.50 | 50 |
| Mineral mixture No. 1 | 1.30 | 26 |
| Salt | 0.30 | 6 |
| Feeding oil (1000 A, 400 D) | 0.15 | 3 |
| Total | 100.00 | 2000 |

TABLE III

FISH FORMULAE

| Commercial Ration | Wt. % | Range |
|---|---|---|
| Wheat Middlings | 25 | 10–30 |
| Fish Meal | 25 | 10–30 |
| Cottonseed Meal | 20 | 10–30 |
| Meat Meal | 5 | 1–9 |
| Liver Meal | 5 | 1–9 |
| Brewer's Yeast | 5 | 1–9 |
| Distillers' Source | 4 | 1–7 |
| Dried Skim Milk | 3 | 0.5–5.0 |
| Blood Meal | 3 | 0.5–4.0 |
| Salt | 2 | 0.5–4.0 |

TABLE III -Continued
FISH FORMULAE

| Commercial Ration | Wt. % | Range |
|---|---|---|
| Alfalfa Meal | 1.3 | 0.5–2.05 |
| Vitamins | 1.7 | 0.5–3.0 |

A typical compounded food formula that may be supplemented with the 1,3 and 1,3,5-x-polyols of this invention is given in Table IV.

TABLE IV
LIQUID FORMULA DIET FOR HUMAN FEEDING

| | Wt. % |
|---|---|
| Soy Protein | 7.59 |
| Skimmed Milk | 9.40 |
| Dextrose-Maltose | 0.86 |
| Corn Oil | 3.85 |
| Lemon Juice (or other flavoring material) | 1.00 |
| Water | 77.30 |
| Salt | qs |
| Vitamins and Minerals | qs |

In order to further illustrate the invention, various tests were carried out which are illustrated in Tables V and VI. It is apparent from these data that the positioning of the hydroxyl groups has a significant effect on the toxicity of these compounds and on their ability to be metabolized. Having hydroxyl groups on the first and third carbons of the chain is sufficient to reduce the toxicity and render the compounds metabolizable.

$LD_{50}$ values are a common measure of the toxicity of a compound. They represent the lethal dose for a 50 percent kill of the animals tested per unit weight of the animals. The higher the $LD_{50}$, the lower the toxicity. The data in Table V establish that the 1,3 and especially the 1,3,5,x- configuration of polyalcohols are the least toxic. The $LD_{50}$ values are significantly higher in compounds possessing this structural feature. The $LD_{50}$ values given in Table V were obtained by giving test animals graded single doses of the test compounds orally and observing them for 1 week. The number of deaths in each group was noted and the dose required for a 50 percent kill taken as the $LD_{50}$ value. In many cases no death occurred, even at the 20 ml/kg level (about as much as you can give a rat in one dose), hence the ">20" values shown in the table.

TABLE V
ACUTE TOXICITY OF VARIOUS POLYOLS

| Compounds | Polyols | Oral $LD_{50}$ (7 days)[1,2] |
|---|---|---|
| 1 | 1,3-pentanediol | >20 ml/kg |
| 2 | 1,5-pentanediol | 2 ml/kg |
| 3 | 1,3-hexanediol | >20 ml/kg |
| 4 | 1,5-hexanediol | >20 ml/kg |
| 5 | 2,5-hexanediol | 2 ml/kg |
| 6 | 1,6-hexanediol | 5 ml/kg |
| 7 | 1,3-heptanediol | >20 ml/kg |
| 8 | 1,3-octanediol | >20 ml/kg |
| 9 | 1,3-nonanediol | >20 ml/kg |
| 10 | 1,3-decanediol | >20 ml/kg |
| 11 | 1,3-undecanediol | >20 ml/kg |
| 12 | 1,3,5-hexanetriol | >25 ml/kg |

[1]Single dose in rats
[2]$LD_{50}$=lethal dose for 50% kill

The data shown here show the advantage of the 1,3-dihydroxy and 1,3,5,x-polyhydroxy structures in reducing toxicity of polyols. Compare compound 1 with 2, for example, and compounds 5 and 6 with compound 3. The only exception is 1,5-hexanediol (compound 4) which is not toxic. However, it is not well metabolized. (See Table VI.)

TABLE VI
NUTRITIONAL TESTING OF DIOLS AND POLYOLS[1]

| Compound | Available Calories K cal/gm) | | % Utilized[2] |
|---|---|---|---|
| | Calc. | Obs. | |
| 1,3-pentanediol | 7.5 | 7.8 | 100 |
| 1,3-heptanediol | 8.2 | 8.0 | 98 |
| 1,3,5-hexanetriol | 6.6 | 3.0[3] | 45[3] |
| 1,3-hexanediol | 7.8 | 6.6 | 85 |
| 1,3-octanediol | 8.2 | 5.8 | 71 |
| 1,5-hexanediol | 7.8 | 0.0[4] | — |

[1]Values given are averages of several experiments
[2]Determined by dividing observed calories by calculated calories
[3]Based upon amount of test compound consumed; the test animals ate less of the 1,3,5-hexanetriol. What was eaten was metabolized to the extent of 45%
[4]Rats experienced a weight loss with this compound The data in Table VI clearly establish the usefulness of 1,3-diols and 1,3,5,x-polyols as metabolic energy sources. In nearly all instances these compounds were 70 percent utilized or better. In certain cases the utilization was 100 percent. The test compounds were fed successfully at levels up to 70 percent of the dry weight of the diet. However, they were somewhat better tolerated by the animals at levels of 5–25 percent (dry weight). The poor results obtained with 1,5-hexanediol further confirms the importance of the 1,3- or 1,3,5,x- positioning of the hydroxyl groups. Compounds with hydroxyls on other positions are not metabolized satisfactorily. There was no observed reduction in utilization with increasing molecule weight of the series of diols. In fact, the higher molecular weight compounds may be more valuable since they possess a higher caloric density.

The usefulness of these polyols is further demonstrated by the typical growth curves shown in FIG. 1. These curves were obtained by feeding test groups, of 5–10 rats each, various amounts of several high energy supplements. The basal diets in each case contained sufficient protein, salts, vitamins and minerals to support normal growth. However, the basal diets were deficient in energy (calories). This deficit was, in part, overcome by adding varying amounts of several energy sources. The greater the amount of energy, the better the growth of the animals. This is evidenced by the consistent, positive slope of the lines in FIG. 1.

The curves in FIG. 1 were obtained by plotting the average change in body weight of the test animals against the amount of high energy supplement added to the basal diet. Curves 1 and 2 were obtained with glucose and sucrose, two typical, natural foods of the carbohydrate type. Curve 5 was obtained with lard, a typical, natural fat. Curves 3 and 4 represent two of the compounds claimed in this invention, 1,3-hexanediol and 1,3-octanediol. Similar curves were obtained with all the 1,3-diols listed in Table VI. The growth obtained with lard (curve 5) is considerably better than that from the carbohydrates (curves 1 and 2) which is to be expected since lard provides twice the amount of calories per unit weight than does glucose or sucrose.

These data clearly indicate the value of the 1,3-diols as dietary energy sources. These compounds are manifestly superior to the carbohydrates and are virtually as good as lard. In addition, they possess all the advantages over natural foods which were enumerated above.

The feeding studies were conducted ad libitum, that is, the animals were given free choice as to food intake. The good results shown in FIG. 1 indicate that there is no palatability problem; the animals readily accepted the new diets. Thus, the data in Table I show the diols are potentially high in energy (calories) and possess certain desirable physical properties. The data in Table V establish the fact that the 1,3-diols and 1,3,5,x-polyols are nontoxic and, by comparison with other diols, that the 1,3- and 1,3,5,x-configuration uniquely reduces the toxicity of polyalcohols. The data in Table VI indicate that the 1,3-diols and 1,3,5,x-polyols are metabolized well while other diols, such as the 1,5-hexanediol, are not. This further implies that the diols are readily absorbed and are palatable to the animals.

The data in FIG. 1 extend those in Table VI and make a direct comparison with traditional foods (such as fats and carbohydrates) possible. It is apparent that the 1,3-diols are better than carbohydrates and equal to, or better, than fats. Therefore, they (the diols) may be used as replacements for fats and carbohydrates.

LEGEND FOR FIGURE 1

| Curve | Symbol | Represents |
|---|---|---|
| 1 | Δ | Basal diet plus various amounts of glucose, a typical carbohydrate |
| 2 | • | Basal diet plus various amounts of sucrose, a typical carbohydrate |
| 3 | × | Basal diet plus various amounts of 1,3-hexanediol, one of the test compounds |
| 4 | 0 | Basal diet plus various amounts of 1,3-hexanediol, one of the test compounds |
| 5 | ⊗ | Basal diet plus various amounts of lard, a typical fat |

The food formulations of the present invention are particularly desirable in commercial fish feeds. "Fish farming" is a rapidly expanding industry which provides one important method for producing good quality protein for human consumption. This industry requires the development of new, synthetic feed formulations containing the necessary nutrients in the proper form and consistency for optimum growth of the fish under artificial conditions. The 1,3-diols are particularly useful as an energy-yielding component of the fish diet for the following reasons.

1. They are high in energy (calories); they are non-toxic; they are metabolized completely.
2. They can be produced readily by chemical means and reduce the dependence of the fish industry on agricultural nutrients.
3. They act as mold inhibitors and preservatives for the diets.
4. They are viscous oils of intermediate water solubility and good surface active properties so that they can serve as a binder and a plasticizer to give the formulations the proper consistency and stability.

The properties mentioned in (4) are especially important. They give 1,3-diols a significant advantage over other energy sources. A major problem in feeding aquatic animals is molding the diet into a suitable form, such as a pellet, which will be stable under aqueous conditions. The proper consistency for such formulations varies with the type of animals being fed. This is especially critical in feeding shell fish which will not ingest the food unless it has just the right consistency. The 1,3-diols have physical properties rendering them uniquely useful as a binder and plasticizer for these formulations.

A typical commercial fish feed formulation as modified according to this invention is shown in Table VII.

TABLE VII

FISH FORMULAE

| Commercial Ration | Weight Percent | Range |
|---|---|---|
| Wheat Middlings | 20 | 10-30 |
| Fish Meal | 20 | 10-30 |
| Cottonseed Meal | 20 | 10-30 |
| Meat Meal | 5 | 1-9 |
| Liver Meal | 5 | 1-9 |
| Brewer's Yeast | 5 | 1-9 |
| 1,3-diol | 10 | 1-20 |
| Distiller's Source | 4 | 1-7 |
| Dried Skim Milk | 3 | 0.5-5.0 |
| Blood Meal | 3 | 0.5-5.0 |
| Salt | 2 | 0.5-4.0 |
| Alfalfa Meal | 1.3 | 0.5-2.5 |
| Vitamins | 1.7 | 0.5-3.0 |

Any one of the diols or a mixture of same may be used. The diols may be incorporated in the ration at levels from 1-20 percent, preferably from 5-15 percent and, most preferably, about 10 percent. If higher levels are desired, the diol should replace an equal amount of wheat middlings or cottonseed meal or both.

The diets may be blended and extruded into small pellets or into other suitable forms, depending on the particular application. Many types of fish can be raised. Examples are trout, salmon, bass, perch, catfish, carp, sardines, mackerel, the Asian milkfish, mullet and others. Many shell fish, mollusks, lobsters, oysters and shrimp are also candidates for this type of aquaculture.

Similarly, the mash feed shown in Table II is modified, for example, by backing out 5 lbs. of the 25 lbs. of ground corn and adding in lieu thereof, 5 lbs. of 1,3-heptanediol. Other diols, or mixtures of diols, can be incorporated in the mash at levels ranging from 1 to 20 percent.

A typical high energy bread formula is shown in Table VIII. The formula is baked in the normal manner using the "sponge" method of baking.

TABLE VIII

HIGH ENERGY BREAD FORMULA CONTAINING 1,3-DIOLS

| | Weight (grams) |
|---|---|
| Flour | 700.0 |
| Water | 430.5 |
| Yeast | 14.0 |
| Yeast food | 3.5 |
| Non-fat milk solids | 21.0 |
| Sugar | 35.0 |
| 1,3-Diol | 5.0 |
| Card | 12.0 |
| Salt | 14.0 |

What is claimed is:

1. A method of increasing the metabolic energy sources in human and animal basal diets comprising incorporating in said basal diets from about 10 percent to 20 percent on a dry weight basis of a compound selected from linear aliphatic 1,3-diols and mixtures thereof, said diols having from five to 15 carbon atoms in the molecule.

2. The method of claim 1 wherein the diol has from five to 10 carbon atoms.

3. The method of claim 1 wherein said diol is 1,3-hexanediol.

4. In basal diets designed for human consumption that contain sufficient protein, salts, vitamins and minerals to support normal growth, the improvement comprising incorporating in said basal diets from 10 percent to 20 percent on a dry weight basis of a compound selected from linear aliphatic diols and mixtures of diols, said diols having from five to 10 carbon atoms and having hydroxy groups on the first and third carbon atoms whereby the metabolic energy sources of the diets are increased.

5. A method for increasing metabolic energy sources in animal basal diets comprising incorporating in said diets from about 1 percent to about 20 percent by weight of a compound selected from the linear aliphatic diols having from five to 15 carbon atoms in a molecule being further characterized by having hydroxy groups only on the first and third carbon atom.

6. A high energy food composition comprising a basal animal diet containing sufficient protein, salts, vitamins and minerals to support normal growth and from 1 percent to 20 percent on a dry weight basis of a linear aliphatic diol, said diol having from five to 15 carbon atoms and having hydroxy groups on the first and third carbon atoms.

7. The composition of claim 6 wherein said diol is 1,3-heptanediol.

8. A high energy fish food composition comprising a basal fish diet in amounts sufficient to support normal growth and from about 5 to about 15 percent of a linear aliphatic diol having from five to 15 carbon atoms and having hydroxy groups on the first and third carbon atom.

9. The composition of claim 8 wherein said diol is 1,3-heptanediol.

* * * * *